No. 862,861.
PATENTED AUG. 6, 1907.
J. S. BARNES.
DRILLING MACHINE.
APPLICATION FILED MAY 2, 1907.
2 SHEETS—SHEET 2.
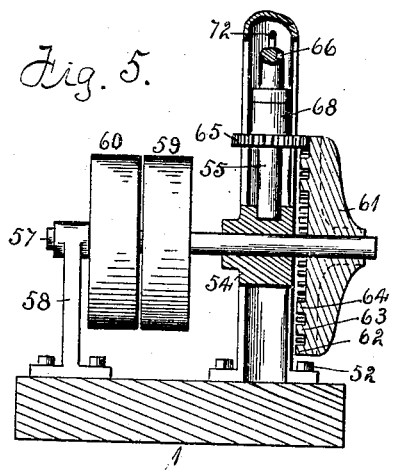
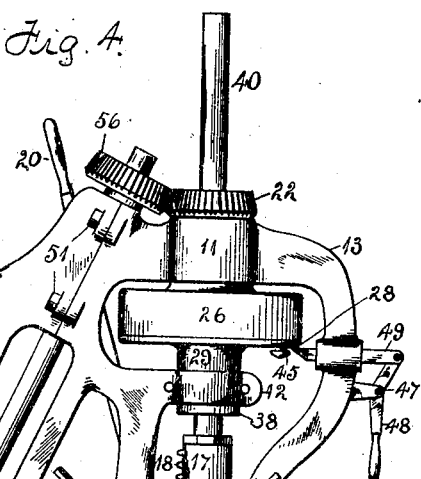
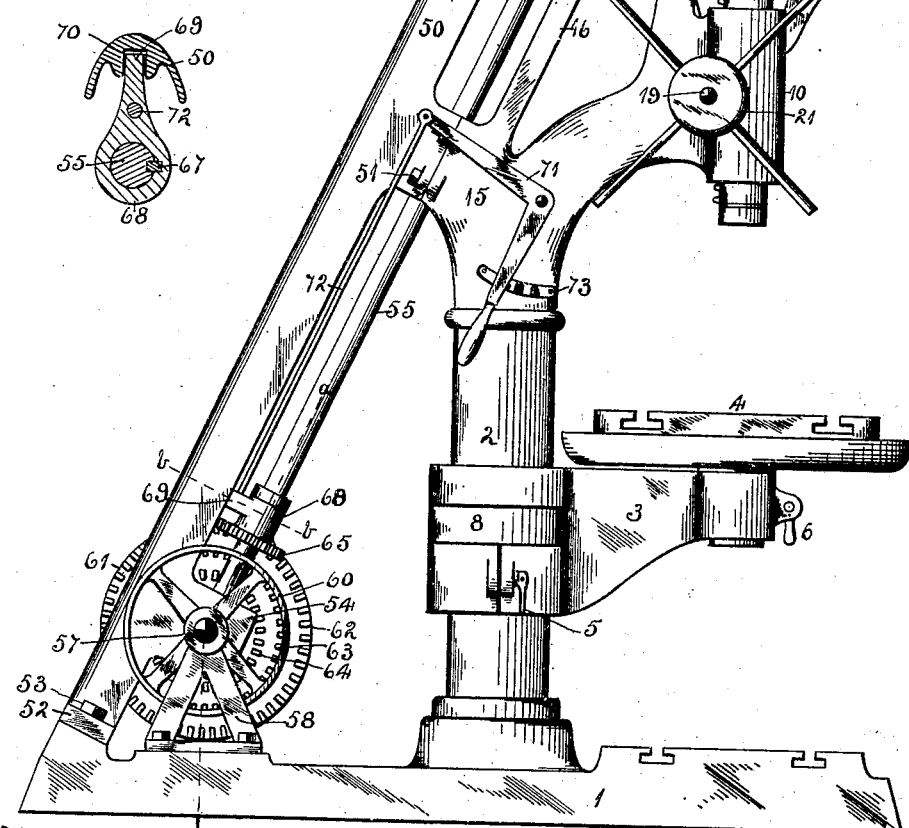
Witnesses:
J. S. Clark
E. Behel
Inventor:
John S. Barnes.
By A. O. Behel
Atty.

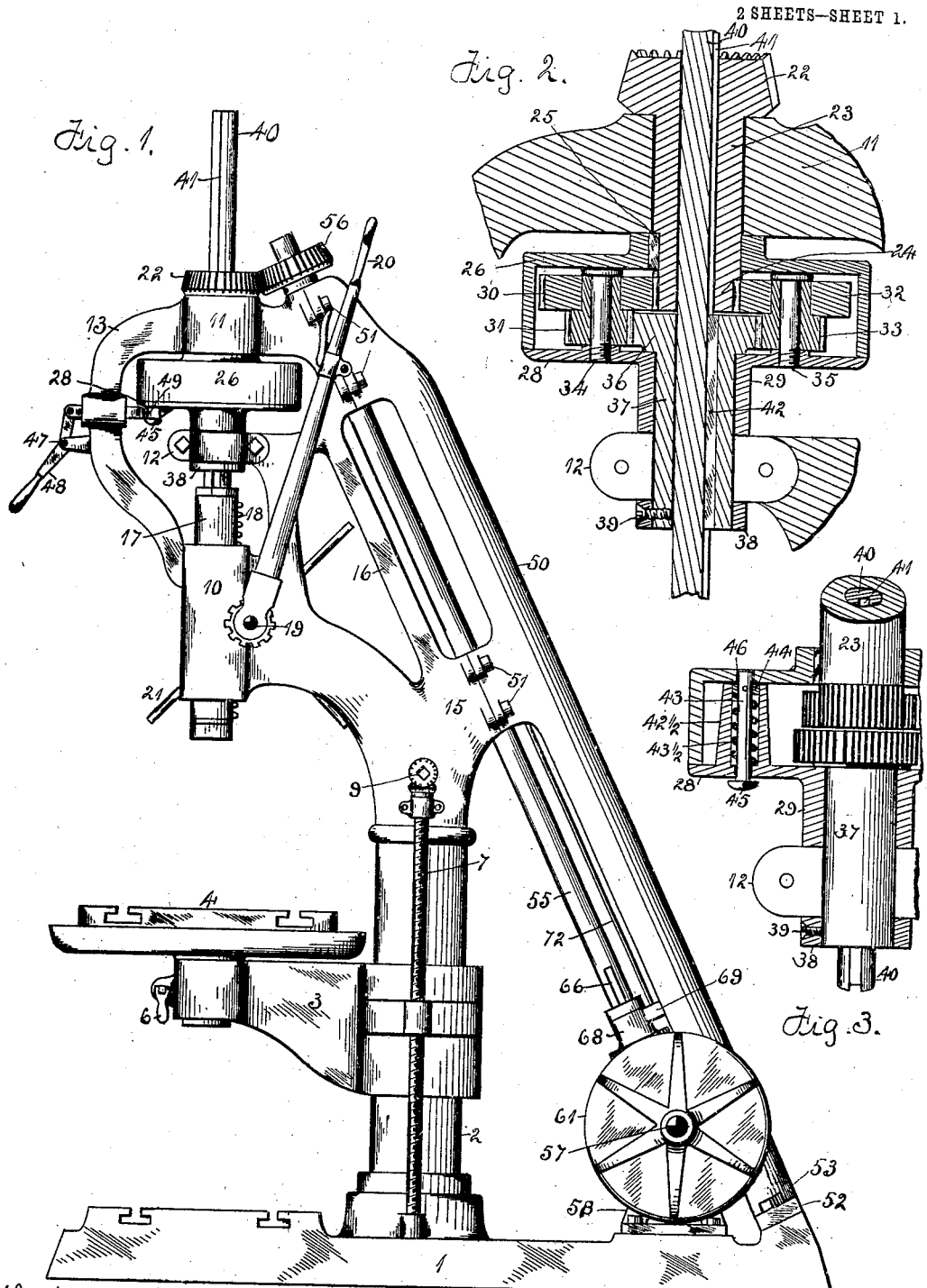

UNITED STATES PATENT OFFICE.

JOHN S. BARNES, OF ROCKFORD, ILLINOIS, ASSIGNOR TO W. F. & JOHN BARNES COMPANY, OF ROCKFORD, ILLINOIS, A CORPORATION OF ILLINOIS.

DRILLING-MACHINE.

No. 862,861.  Specification of Letters Patent.  Patented Aug. 6, 1907.

Application filed May 2, 1907. Serial No. 371,542.

*To all whom it may concern:*

Be it known that I, JOHN S. BARNES, a citizen of the United States, residing at Rockford, in the county of Winnebago and State of Illinois, have invented new and useful Improvements in Drilling-Machines, of which the following is a specification.

The object of this invention is to construct a drilling machine frame of great strength by the employment of a suitable diagonally arranged back bone or brace extending substantially parallel with the driving shaft.

The further object of this invention is to form a back gear for the drill spindle.

The further object of this invention is to produce a positive and variable drive for the drill spindle.

In the accompanying drawings. Figure 1 is an elevation of my improved drill as seen from the hand lever side. Fig. 2 is a vertical section through the back gear for the drill spindle. Fig. 3 is a vertical section through the back gear for the drill spindle showing the arrangement for cutting out the gearing and producing a direct connection. Fig. 4 is an elevation of the drill as seen from the reverse side to that shown at Fig. 1. Fig. 5 is a section on dotted line $a\ a$ Fig. 4. Fig. 6 is a section on dotted line $b\ b$ Fig. 4.

From the base 1 extends vertically a column 2, around which is located a bracket 3 which supports a table 4. The bracket 3 is held from turning in connection with the column by the clamp 5, and the table is held from turning in connection with the bracket by the clamp 6. A vertically arranged screw 7 is supported by the column and has a screw-thread connection with the collar 8 which acts upon the bracket 3 and by reason of this screw, the bracket can be raised or lowered. Suitable gearing 9 connects with the screw 7 and by means of a crank, the gearing can be rotated which will rotate the screw or raise and lower the table. From the upper portion of the column extends a head composed of the lower bearing 10, upper bearing 11 and intermediate bearing 12. A bracket 13 connects the bearings 10 and 11 and serves to give rigidity to the bearings. The head is provided with two half boxes 14 and 15 which are connected by a brace-bar 16. The bearing 10 supports a sleeve 17 which is provided with the usual toothed rack 18.

The cross spindle 19 has the usual pinion engagement with the toothed rack, and a hand lever 20 and a pilot wheel 21 serve to rotate the cross-shaft for the purpose of raising and lowering the sleeve.

The bearing 11 supports a bevel gear 22 by its hub 23 located in the bearing. The lower end of this hub 23 is in the form of a spur pinion 24, and the lower end of the hub is formed with a key-way 25.

A back gear is located between the bearings 11 and 12 and comprises the casing 26 which is connected to the hub 23 of the bevel gear 22 by the key 25 so that the bevel gear and casing will rotate together. The spur pinion 24 extends within the casing as shown at Figs. 2 and 3.

A cap 28 has a hub 29 which is seated on the intermediate bearing 12. This cap supports the spur gears 30, 31, 32 and 33 by the studs 34 and 35 in a manner to permit them to rotate idly thereon.

A spur gear 36 is located within the casing 26 and is in mesh with the spur gears 31 and 33. A tubular shank 37 depends from the spur gear 36, and a collar 38 is connected to its lower end by the screw 39. This collar 38 is located beneath the intermediate bearing 12 and serves to hold the spur gear 36 against upward vertical movement, and as the lower face of this spur gear is seated against the inner face of the cap 28 it cannot move downward, thus it will be held from vertical movement.

A drill spindle 40 has a connection with the sleeve 17 in a manner to rotate in connection therewith and to be moved vertically as the sleeve is moved vertically. This drill spindle is provided with a lengthwise extending key-way 41. The drill spindle is located within the central lengthwise opening of the bevel gear 22, its hub 23 and the spur pinion 24, and in the opening of the spur gear 36 and its hub 37. A key 42 is located in the key-way of the drill spindle and connects the drill spindle with the spur gear 36 and its hub 37 as shown at Fig. 2.

From the upper face of the cap 28 extends a tubular stud $42\frac{1}{2}$, and within the opening of this stud is located a plunger 43 around which is placed a coiled spring $43\frac{1}{2}$, one end of which rests against the cap and the other end against a collar 44 pinned to the plunger. One end of this plunger is provided with a head 45, and its other end is adapted to be moved into an opening 46 in the casing 26.

From the bracket 13 extends an ear 47 to which is pivoted a lever 48. A slidable bar 49 is supported by the bracket 13, its outer end being pivotally connected with the lever 48 and its inner end being beveled.

The bevel gear 22 is intended to be rotated by means to be hereinafter described, and the rotation of this gear will also rotate the casing 26 and spur pinon 24 in the same direction. When the plunger 43 is in engagement with the casing 26 as shown at Fig. 3, the cap 28 and casing 26 will be connected to rotate in unison, and as the spur gears 30, 31, 32 and 33 are carried by the cap and the gears 30 and 32 being in mesh with the spur pinion 24, and the spur gears 31, and 33 being in mesh with the spur gear 36, the rotary movement of the cap will be imparted to the spur gear 36 and through it to the drill spindle 40, that is revolution for revolution of the bevel gear 22 will be imparted to the drill spindle, or in other words a direct driving connection will be established between the bevel gear 22 and the drill spindle 40.

By inserting the end of the bar 49 between the cap 28 and the head 45 of the plunger 43, the plunger is held withdrawn from its connection with the casing 26, and at the same time the cap is held against rotation which will also hold the studs 34 and 55 from bodily movement but permitting the spur gears 30, 31, 32 and 33 to rotate idly thereon. As the spur pinion 24 rotates with the bevel gears 30, 31, 32 and 33, it will rotate the spur gear 36 and through the key 42, the drill spindle 40 will be rotated.

When the cap 28 is held against rotation, the rotation of the drill spindle will be slower than the rotation of the bevel gear 22 which is necessary for heavy work.

To the half boxes 14 and 15 is secured a back bone or brace 50 by the tap screws 51, and the lower end of this back bone has a foot portion 52 connected to the base 1 by the tap screws 53. This back bone is in U form to give it strength and at the same time lightness. From the lower end of the back bone extends a bearing 54 in which is seated the lower end of the driving shaft 55. This driving shaft 55 is supported in bearings at the points of connection of the back bone by the tap screws 51 and to its upper end is secured a bevel gear 56 which meshes with the bevel gear 22, and by which the drill spindle is rotated. The back bone and driving shaft extend parallel with one another and diagonal to a vertical line in order that the back bone will brace the head portion of the drill, and by extending parallel with the driving shaft it will prevent the binding of the shaft in its bearings. A cross shaft 57 is supported in the bearing 54 and the bracket 58 secured to the base 1 of the drill. This cross shaft supports the tight and loose pulleys 59 and 60, and also has a plate 61 secured to it. This plate 61 has, in this instance, three concentric rows of teeth 62, 63 and 64. A spur toothed wheel 65 has a slidable connection with the driving shaft 55 by means of the groove 66 and key 67. A collar 68 supports the spur toothed wheel 65 and has a projection 69 guided in a way 70 formed in the inner face of the back bone.

A bell crank lever 71 is pivotally supported by the frame of the drill and a rod 72 connects one end of the bell-crank lever with the projection 69. A toothed plate 73 is secured to the frame of the drill and with which the handle portion of the bell-crank lever engages. The spur toothed wheel 65 is constructed to be moved into mesh with the teeth 62, 63 and 64 of the plate 61. This is accomplished by means of the bell-crank lever 71, and when properly adjusted the toothed plate 73 will hold it in place.

A belt connection is made with the tight pulley 59 which will rotate the cross-shaft 57 and the plate 61 connected to it. The teeth of the plate 61 will rotate the spur-toothed gear 65 and it will rotate the driving shaft 55.

By the arrangement of the teeth on the plate 61, three different speeds can be imparted to the driving shaft, and each of the speeds will be positive in its action.

When material being operated upon is placed on the base 1 of the drill, great strain is imparted to the upper portion of the frame and by the employment of the back bone, extending diagonal to the drill spindle, the upper portion of the frame will be held in a rigid manner.

I claim as my invention.

In a drilling machine, the combination of a base, a frame connected with the base, a drill spindle supported by the frame, a driving shaft having a driving connection with the drill spindle and located diagonally with respect to the drill spindle and a back bone or brace extending substantially parallel with the driving shaft and connecting the base with the upper portion of the frame.

In testimony whereof I have hereunto set my hand in presence of two subscribing witnesses.

JOHN S. BARNES.

Witnesses:
 A. O. BEHEL,
 E. BEHEL.